United States Patent [19]
Kern et al.

[11] Patent Number: 5,914,551
[45] Date of Patent: Jun. 22, 1999

[54] ELECTRICAL ALTERNATOR

[75] Inventors: Robert D. Kern; Andrew B. Robson, both of Waukesha; Gerald C. Ruehlow, Oconomowoc, all of Wis.

[73] Assignee: Generac Corporation, Waukesha, Wis.

[21] Appl. No.: 08/949,355

[22] Filed: Oct. 14, 1997

[51] Int. Cl.⁶ .............................. H02K 5/00; H02K 5/16; H02K 5/18; H02K 7/10
[52] U.S. Cl. .................................................. 310/91
[58] Field of Search ..................... 310/67 R, 68 R, 310/153, 91

[56] References Cited

U.S. PATENT DOCUMENTS

| | | | |
|---|---|---|---|
| Re. 31,947 | 7/1985 | Farr | 310/153 |
| 3,179,825 | 4/1965 | Terry et al. | 310/67 R |
| 3,955,550 | 5/1976 | Carlsson | 310/153 |
| 4,203,710 | 5/1980 | Farr | 310/153 |
| 4,288,712 | 9/1981 | Hagenlocher et al. | 310/91 |
| 4,431,931 | 2/1984 | Perrier et al. | 310/67 R |
| 4,546,280 | 10/1985 | Pfluger | 310/68 D |
| 4,604,538 | 8/1986 | Merrill et al. | 310/68 D |
| 4,680,495 | 7/1987 | Ciampas et al. | 310/220 |
| 4,849,665 | 7/1989 | Kitamura et al. | 310/68 D |
| 4,945,272 | 7/1990 | Ochi et al. | 310/91 |
| 4,980,589 | 12/1990 | Ochi et al. | 310/68 D |

FOREIGN PATENT DOCUMENTS

63-171144  7/1988  Japan ...................................... 310/153

*Primary Examiner*—Clayton LaBalle
*Attorney, Agent, or Firm*—Janssen, Shupe, Bridge & Munger, Ltd.

[57] ABSTRACT

An electrical alternator includes a stator with circumferentially-spaced stator arms, each having a coil wound on it. The rotor includes a cup-shaped support component with a plurality of magnets affixed to the inner surface of the component rim so as to be in excitation relationship to the coils. The improvement comprises a hub including (a) a first hub portion having the stator affixed thereto, and (b) a second hub portion axially spaced from the first hub portion. A ribbed section is affixed to the hub between the hub portions and includes a primary mount and two auxiliary mounts. The primary mount is bolted to an engine block. The alternator affords a high degree of mounting flexibility in that the alternator can be mounted toward the left or right of the engine and either one of the auxiliary mounts used for alternator attachment to a mounting bracket. Novel cooling and voltage regulator mounting arrangements are also disclosed.

19 Claims, 7 Drawing Sheets

ELECTRICAL ALTERNATOR

FIELD OF THE INVENTION

This invention relates generally to electric generator structure and, more particularly, to "dynamo" type rotary generators and supporting elements.

BACKGROUND OF THE INVENTION

With infrequent exception, internal combustion engines are started by "cranking" the engine using a starter motor which draws electricity from a storage battery. A passenger auto is perhaps the most common example of such an arrangement although it is certainly not the only example.

Another example is an engine-generator set used to provide electrical power when no utility power is available or easily available. Such sets are often used at construction sites and are started by depressing a button or the like. And when a set is used to provide power in the event of a utility power failure, it is often referred to as a "standby" power unit. Hospitals are commonly equipped with such power units. If commercial power fails, the engine starts automatically, using a starter motor and battery as described above.

In the foregoing examples, the electrical "charge" in the battery is maintained by a rotating, dynamo-type generator or alternator and in this specification, the term "alternator" means either generator or alternator. Very typically, the alternator includes a drive pulley engaged by the same fan belt which drives the engine cooling fan, the water pump and perhaps other auxiliary equipment. Commonly, the alternator is mounted by a bolt securing one alternator mounting "ear" to the engine block and a second mounting ear to a slotted arm of some type which protrudes away from the block. U.S. Pat. No. 4,849,665 (Kitamura et al. shows such an arrangement. Other examples of engine-driven alternators are disclosed in U.S. Pat. Nos. 4,288,712 (Hagenlocher et al.); 4,546,280 (Pfluger); 4,604,538 (Merrill et al.); 4,680,495 (Chiampas et al.) and many others.

Mounting an alternator and its voltage regulator in operative relationship to the prime mover engine involves a number of design considerations. Among them are available space, the number of different engine configurations with which the alternator is to be used, alternator component cooling and simply the ease of mounting.

If the engine is in an enclosure, available space may be at a premium—many other components in addition to the alternator must be mounted in close proximity to the engine. And even if no enclosure is used, it is preferred that the alternator be mounted very close to the engine. A known alternator mounting arrangement has the alternator protruding sideways well beyond the engine block. So positioned, it is not surprising that passing equipment may strike and damage the alternator.

If an alternator is to be used with but a single engine, the alternator may be configured for optimal mounting to such engine. But, often, a manufacturer wishes to provide more mounting flexibility by configuring the alternator to mount easily on different engines.

The alternator disclosed in the Hagenlocher et al. patent is an example and includes a shell having an integral attachment projection. One end of the shell is covered by an end shield having an integral positioning arm. The attachment portion and positioning arm receive bolts for alternator mounting. At least that edge of the shell to which the end shield attaches is hex-shaped as is the shield. Therefore, the shield and shell can be mounted in any of six (effectively, five) different mounting positions with respect to one another. But, of course, this can be accomplished in the field only by removing the shield and that involves significant disassembly.

At the least, the matter of alternator component cooling involves properly cooling the voltage regulator. The Pfluger and Chiampas et al. patents noted above and U.S. Pat. No. 4,705,983 (Franz et al.) all show voltage regulators enclosed in some sort of housing. Seemingly, the rate of air flow thereacross will be less than optimal and the temperature in the housing is likely to be higher than outside such housing.

Another known way of mounting a voltage regulator is on a bracket or support separate from the alternator. Wires and a plug connect the alternator and the voltage regulator to one another. While regulator cooling is satisfactory with this arrangement, the installer needs to mount two separate components—and separately replace them when making repairs.

An improved electrical alternator which addresses disadvantages of earlier, known arrangements would be an important advance in the art.

OBJECTS OF THE INVENTION

An object of the invention is to provide an improved electrical alternator which overcomes some of the problems and disadvantages of known alternators.

Another object of the invention is to provide an improved electrical alternator suitable for use with internal combustion engines.

Another object of the invention is to provide an improved electrical alternator which is easily adapted to mount on any of a variety of engines.

Yet another object of the invention is to provide an improved electrical alternator which mounts "tucked" in close proximity to the driving engine.

Another object of the invention is to provide an improved electrical alternator having an externally-mounted voltage regulator for quick, easy mounting of both.

Still another object of the invention is to provide an improved electrical alternator which conserves space.

Another object of the invention is to provide an improved electrical alternator which readily adapts to a variety of mounting bracket arrangements. How these and other objects are accomplished will become apparent from the following descriptions and from the drawings.

SUMMARY OF THE INVENTION

The invention involves an improved electrical alternator of the rotary or "dynamo" type and including (a) a stator with a plurality of radially-extending stator arms, each having a coil wound upon it. The rotor has an axis of rotation and includes a cup-like support component with a plurality of magnets affixed to the inside of the component rim so that the magnets are in excitation relationship to the coils. That is, the coils and magnets are relatively positioned so that as the support component (and magnets mounted thereon) are driven, the magnet lines of flux are "cut" by the coils, thereby generating electricity.

The improvement comprises a frame with an elongate, generally-cylindrical hub having first and second hub ends or portions. The stator is affixed to the first portion and the second hub portion is axially spaced from the first. A ribbed section is affixed to the hub between the hub portions, is coincident with a section plane normal to the axis of rotation and includes a plurality of mounts, each having an opening spaced radially away from the hub.

The mounting openings, three in number in a highly preferred embodiment, are formed in primary and first and second auxiliary mounts, respectively. The primary opening is in registry with a primary radial normal to the axis of rotation. Similarly, the first and second auxiliary openings are in registry with first and second auxiliary radials, respectively, and such auxiliary radials are also normal to the axis of rotation In a highly preferred embodiment, the included angle between the primary radial and either of the auxiliary radials is greater than 90°. And the included angle between the auxiliary radials is no greater than 75°.

In another aspect of the invention, the primary opening terminates in a primary mounting face axially spaced from the section plane by a first dimension. The first and second auxiliary openings terminate in first and second mounting faces, respectively, and such mounting faces are axially spaced from the section plane by a second dimension which is less than the first dimension. Such relative axial spacing has been found to facilitate mounting the alternator "tucked" to the left or right side of an internal combustion (IC) engine block and bolted to the block and to a mounting bracket.

In the alternator, there is significant heat buildup in the stator. That is to say, stator temperature rises quickly to a level significantly above ambient. At least, such temperature rise is because of the resistive heat loss during electricity generation. And if the alternator is mounted to or closely proximate an engine block, heat will be transferred from the engine to the alternator.

In recognition of such temperature rise, the ribbed section includes a plurality of cooling apertures in air flow relationship with the stator. It has been found that the rotor magnets and slots therebetween function well to "pump" air through the apertures and cool the stator.

When the alternator is mounted adjacent to a large cooling fan (which forces air through the engine radiator), no additional means need be provided for cooling. However, if no such fan is present, the flat face portion of the cup-shaped support component preferably has a plurality of cooling holes through it. Acting in cooperation, the apertures and holes permit cooling air to flow through the support component and the ribbed section.

In another aspect of the invention, the ribbed section includes a plurality of stiffening ribs extending axially away from the section body. Most preferably, a separate rib extends between the hub and each mounting opening, thereby imparting substantial rigidity to the alternator.

In a highly preferred embodiment, provision is made for rib-mounting a voltage regulator, either to one of the above-described stiffening ribs or to one or two other ribs. In a specific arrangement, there are two mount ribs extending radially away from the hub and axially generally parallel to the axis of rotation. A voltage regulator is attached to at least one mount rib and, most preferably, spans and is attached to respective support posts formed in the two mount ribs. The posts and regulator are located so that the regulator (which also experiences temperature rise in operation) is in air flow relationship with the cooling apertures.

A primary use of the new alternator is in combination with an internal combustion engine having an engine block and a mounting bracket affixed to the engine. When the alternator is mounted, a primary fastener extends through the primary opening and is secured to the block. The first auxiliary opening and its mounting face are axially aligned with the mounting bracket and a first auxiliary fastener extends through the first auxiliary opening and is secured to the mounting bracket. However, the second auxiliary opening is spaced away from the mounting bracket, out of axial alignment with such bracket and is free of a fastener.

In other words, several typical mounting arrangements use the primary opening and only one of the two available auxiliary openings. The particular auxiliary opening used for mounting is often a function of whether the alternator is mounted to the left or right of the block.

In other aspects of the invention, the hub includes a cylindrical bearing bore having a pair of axially-spaced-apart shaft bearings mounted therein. The alternator shaft is rotatably supported by the bearings and has the rotor support component and at least one drive pulley mounted on it. The shaft bearings are spaced to opposite sides of the section plane as are the voltage regulator and the support component.

Other details of the invention are set forth in the following detailed description and in the drawings.

DETAILED DESCRIPTION OF PREFERRED EMBODIMENTS

Figure 1:
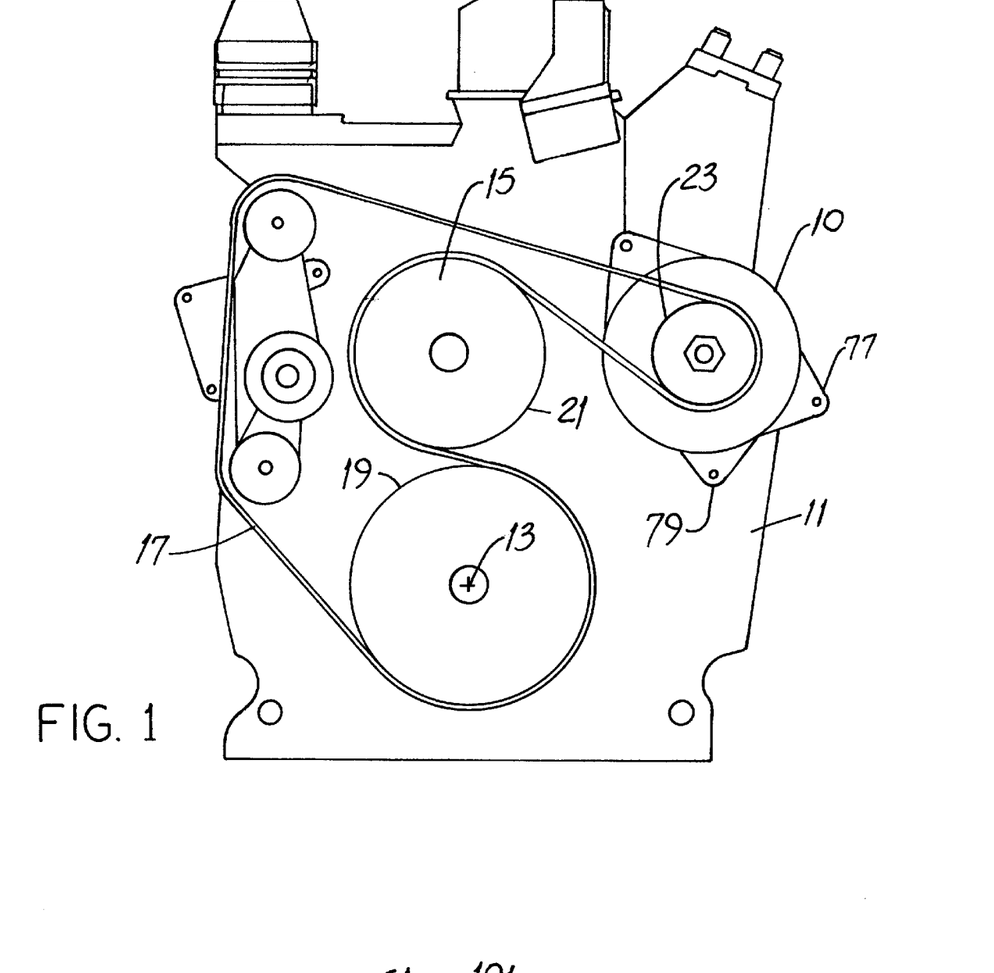
FIG. 1 is a representative elevation view of the new alternator shown in conjunction with an internal combustion engine.
Figure 2:
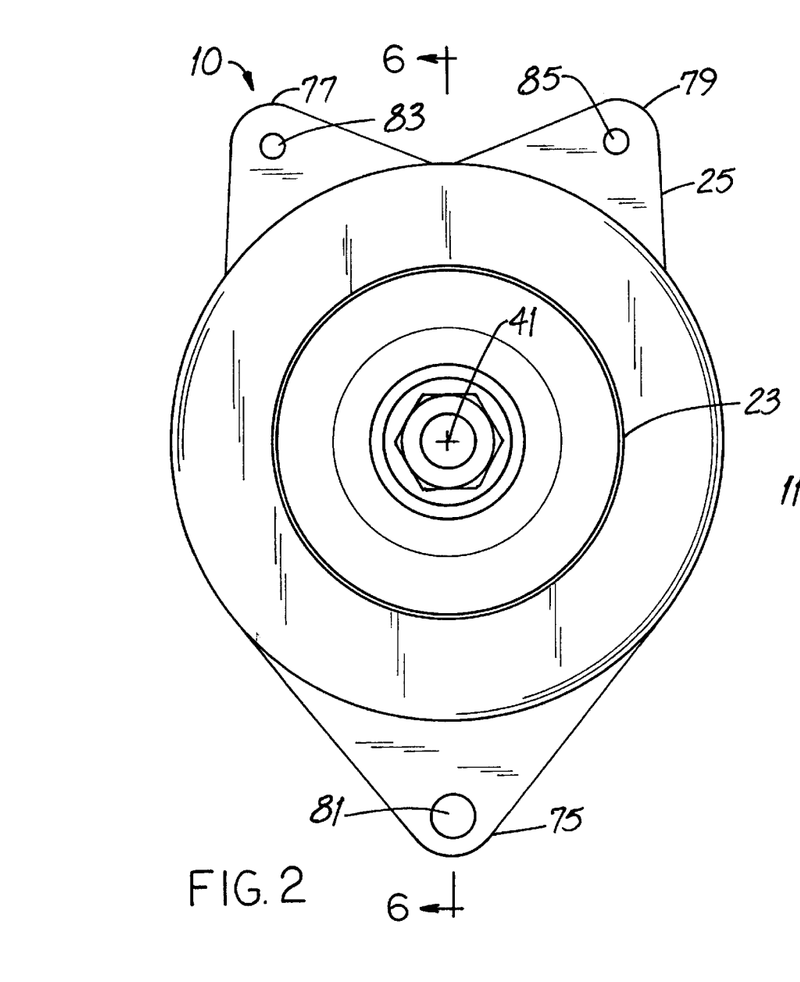
FIG. 2 is a front elevation view of the new alternator.

Before describing details of the new alternator 10, it will be helpful to have a general understanding of one way in which the alternator 10 may be mounted and driven. Referring to FIGS. 1 and 2, an internal combustion engine 11 has a crankshaft rotating about an axis 13. Engine power to drive a standby generator or the like is provided by coupling that end of the crankshaft away from the viewer of FIG. 1 to a generator or to a geared transmission driving the generator. And engine power to drive the alternator 10, the water pump 15, a cooling fan and the like is provided by a continuous belt 17 powered by the crankshaft pulley 19 attached to the crankshaft. The belt 17 also engages the water pump pulley 21 and the alternator drive pulley 23. (While the pump driven by pulley 21 is often referred to as a "water pump," it actually pumps engine coolant comprising, usually, about a 50—50 mixture of water and ethylene glycol, i.e., antifreeze.)

Referring also to FIGS. 2 through 6, the alternator 10 includes a frame 25 (preferably, a casting) having a generally cylindrical hub 27 with first and second hub ends 29 and 31, respectively, and an interior cylindrical bearing bore 33 extending between the ends 29, 31. (The hub 27 is said to be "generally" cylindrical because its exterior surface is somewhat barrel-shaped. But a perfectly-cylindrical hub 27 will work well.)

Figure 6:
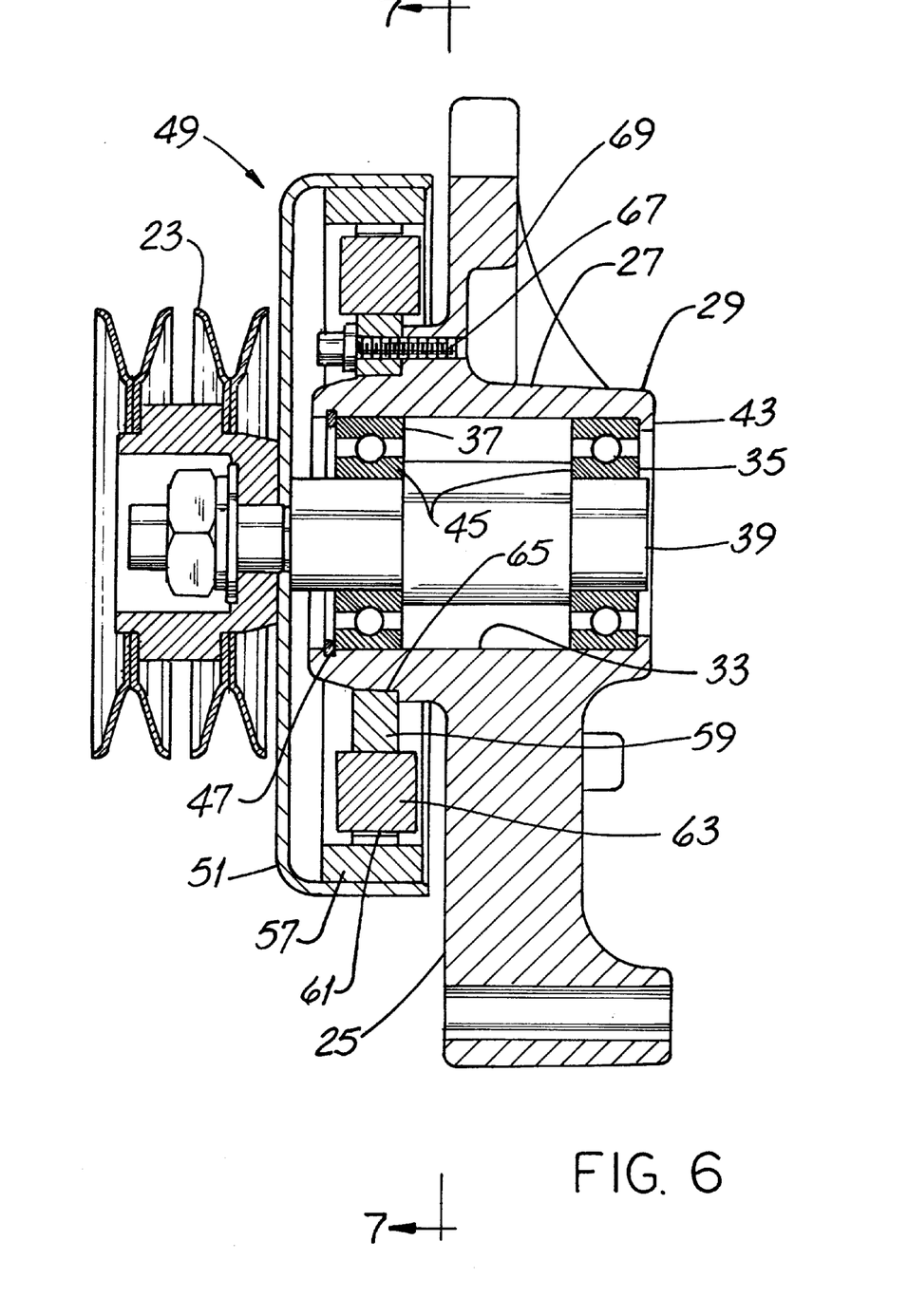
FIG. 6 is a section view of the new alternator taken along the section 6—6 of FIG. 2.

First and second axially-spaced-apart shaft bearings 35, 37, respectively, are mounted in the bore 33 and the alternator shaft 39 is supported by the bearings 35, 37 for rotation about the axis 41. In a very specific embodiment, the first end 29 has an inwardly-projecting annulus 43 to fix the position of the first bearing 35 and the shaft 39 has two shoulders 45 which fix the position of the shaft 39 with respect to the first bearing 35 and which fix the position of the second bearing 37 with respect to the shaft 39. In this configuration, only a single snap ring 47 is needed to hold the shaft 39 and bearings 35, 37 in place. The rotor 49 and drive pulley 23 are fixed to the shaft 39 and rotate with it.

Figure 4:
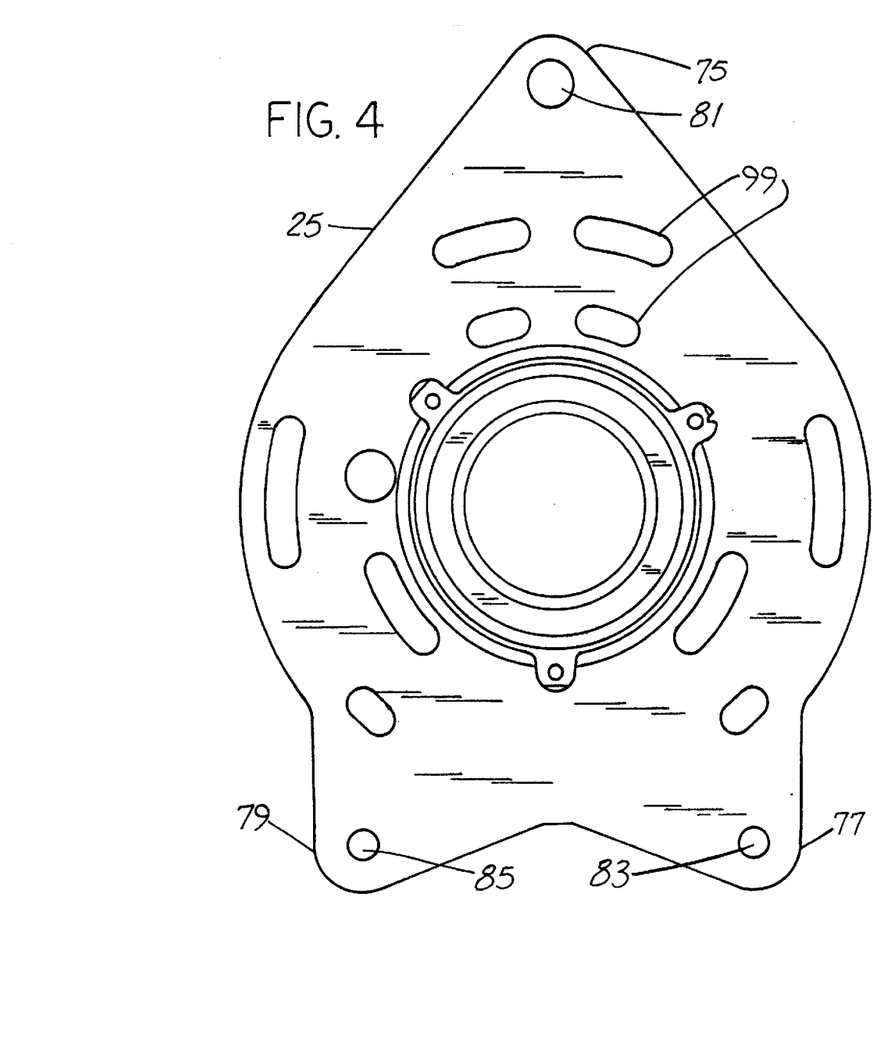
FIG. 4 is a front elevation view of the frame of FIG. 3 taken along the viewing axis VA4 thereof.
Figure 7:
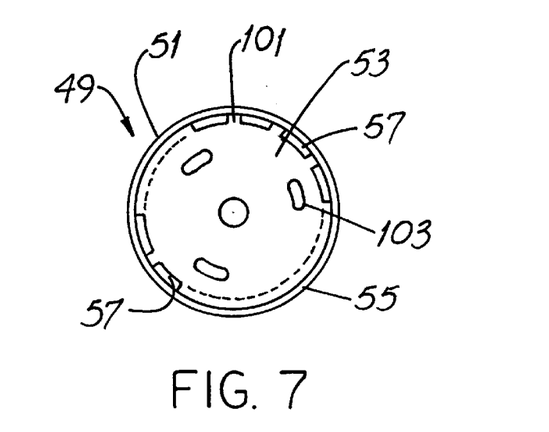
FIG. 7 is an elevation view of the alternator rotor taken along the viewing plane 7—7 of FIG. 6.
Figure 8:
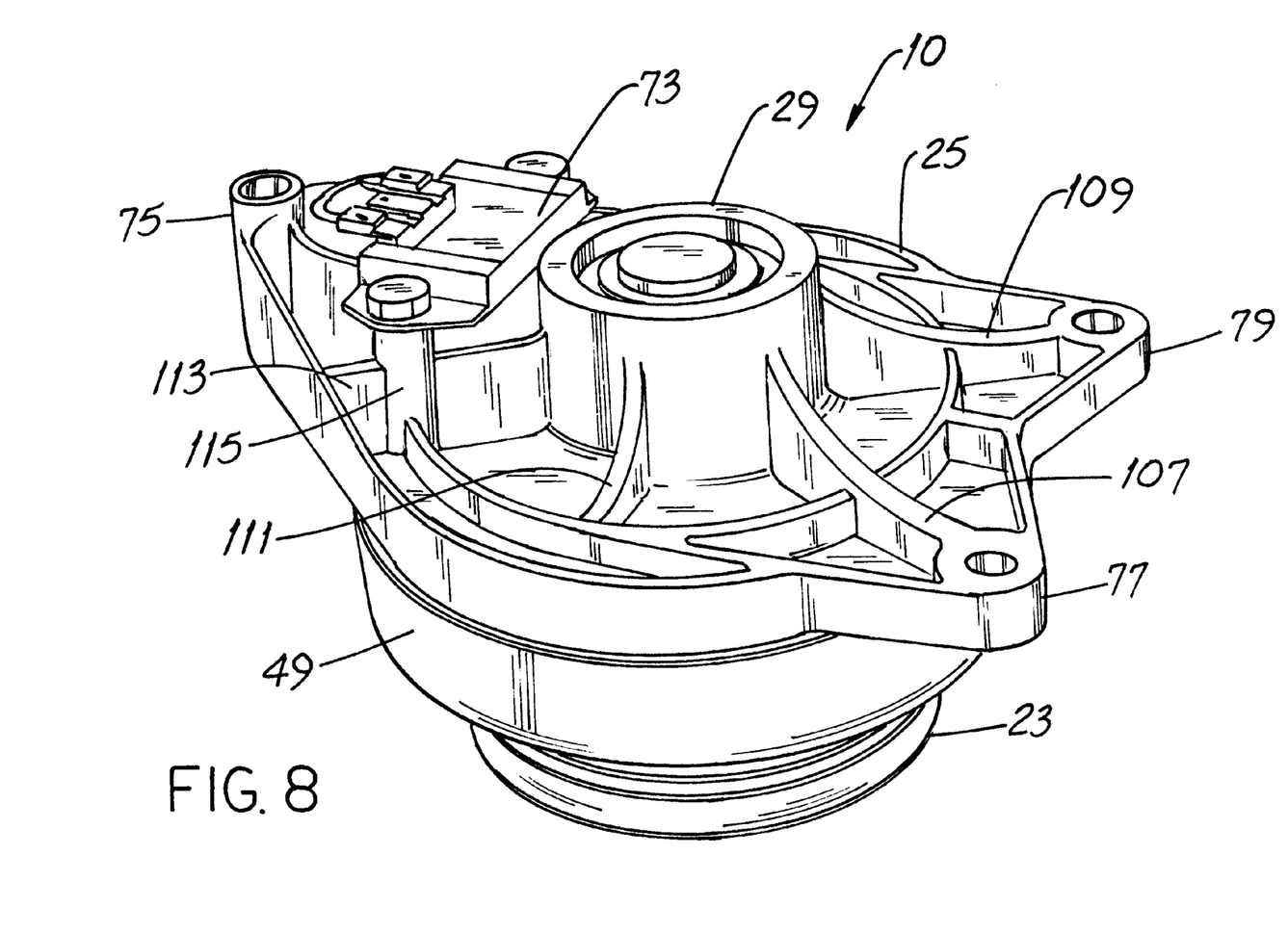
FIG. 8 is a perspective view of the new alternator.

Referring also to FIGS. 7 and 4, the rotor 49 includes a cup-shaped support component 51 having a flat face portion 53 and an axially-extending rim 55 circumscribing such portion 53. Permanent magnets 57 are glued (or otherwise affixed) to the inner surface of the rim 55.

The alternator 10 also includes a stator 59 laminated from sheets of steel. The stator 59 has a number of arms or poles 61 extending radially outwardly and a coil 63 is wound on each pole 61. When the alternator 10 is fully assembled, the magnets 57 are in very close but non-contacting proximity to the pole faces.

The second end 31 of the hub 27 has a mounting surface 65 machined thereon and the inside diameter of the stator 59 and the outside diameter of the surface 65 are cooperatively selected so that the stator 59 is received on the surface 65 with sliding clearance. Bolts 67 affix the stator 59 to the frame 25.

Referring particularly to FIGS. 3, 4, 5, 7 and 8, the frame 25 includes a ribbed section 69 affixed to the hub 27 between the hub ends 29, 31. Such section 69 is coincident with a section plane 71 normal to the axis of rotation 41. The shaft bearings 35, 37 are spaced to opposite sides of the section plane 71 as are the voltage regulator 73 and the support component 51.

In a highly preferred embodiment, the ribbed section 69 includes a primary mount 75 and first and second auxiliary mounts 77 and 79, respectively. The mounts 75, 77, 79 have, respectively, a smooth-bore primary opening 81 and threaded first and second auxiliary openings 83, 85 spaced radially away from the hub 27.

Figure 3:
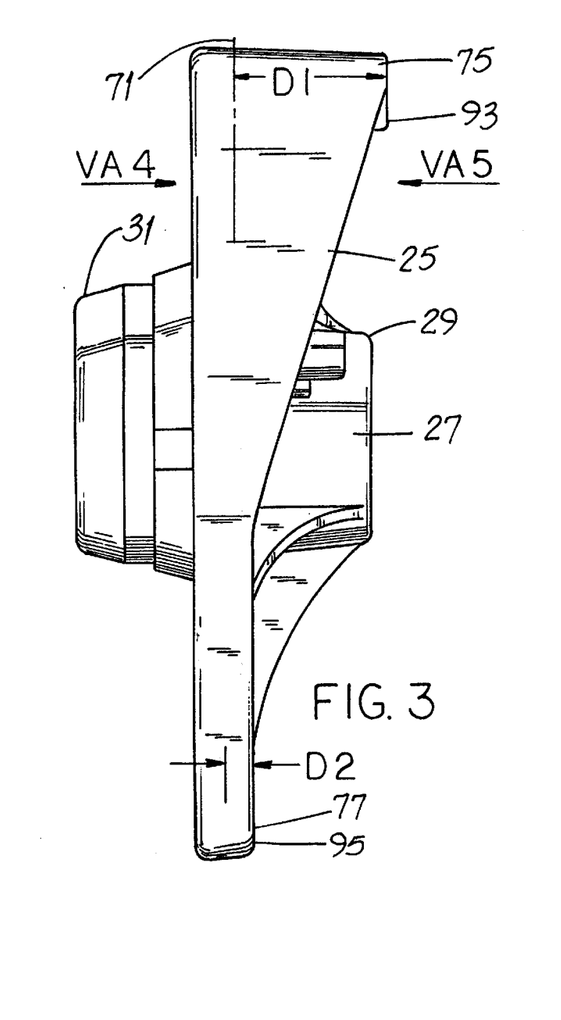
FIG. 3 is a side elevation view of the new alternator frame.
Figure 5:
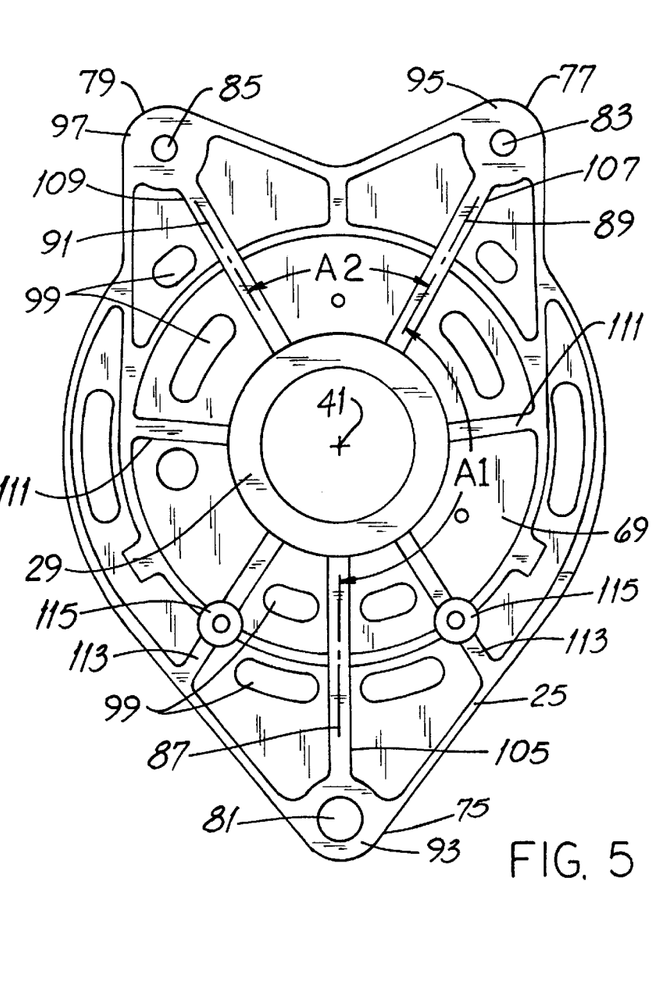
FIG. 5 is a rear elevation view of the frame of FIG. 3 taken along the viewing axis VA5 thereof and inverted.

Referring particularly to FIGS. 3 and 5, the primary opening 81 is in registry with a primary radial 87 normal to the axis of rotation 41. Similarly, the first and second auxiliary openings 83, 85 are in registry with first and second auxiliary radials 89, 91 respectively, and such auxiliary radials 89, 91 are also normal to the axis of rotation 41. The included angle Al between the primary radial 87 and either of the auxiliary radials 89, 91, is greater than 90° and, most preferably, is 150°. And the included angle A2 between the auxiliary radials 89, 91 is no greater than 75° and, most preferably, is 60°.

The primary opening 81 terminates in a flat, annular primary mounting face 93 axially spaced from the section plane 71 by a first dimension D1. The first and second auxiliary openings 83, 85 terminate in first and second mounting faces 95, 97, respectively, and such faces 95, 97, are axially spaced from the section plane 71 by a second dimension D2 which is less than the first dimension D1. Such relative axial spacing and angular relationships have been found to facilitate mounting the alternator 10 closely proximate the left or right side of the block of an internal combustion engine.

Referring now to FIGS. 1, 4, 5 and 7, the ribbed section 69 includes a plurality of cooling apertures 99 in air flow relationship with the stator 59 and rotor 49.

It has been found that when the rotor 49 is being driven by the pulley 23 and belt 17, the rotor magnets 57 and slots 101 therebetween function well to force air through the apertures 99 and cool the alternator 10.

When the alternator 10 is mounted adjacent to a large cooling fan (which forces air through the engine radiator), no additional means need be provided for cooling. However, if no such fan is present or if the fan and alternator 10 are spaced well away from one another, the flat face portion 53 of the cup-shaped support component 51 preferably has a plurality of cooling holes 103 through it. Acting in cooperation, the apertures 99 and holes 103 permit cooling air to flow through the support component 51 and the ribbed section 69.

Referring next to FIGS. 3, 5, 6 and 8, the ribbed section 69 includes a plurality of web-like stiffening ribs extending axially away from the hub 27. Most preferably, a separate rib 105, 107, 109, extends between the hub 27 and each mount 75, 77, 79, respectively, thereby imparting substantial rigidity to the alternator 10. (From the foregoing, it is apparent that the radials 87, 89, 91 are in registry with the ribs 105, 107, 109, respectively.)

But the ribs 105, 107, 109 are not the only stiffening ribs in the most preferred embodiment. The frame 25 also includes two lateral ribs 111 and two mount ribs 113. Like other ribs 105, 107, 109, each mount rib 113 extends radially away from the hub 27 and axially parallel to the axis of rotation 41. Each mount rib 113 includes a support post 115 and the voltage regulator 73 is attached to and spans the posts 115. The posts 115 and regulator 73 are located so that the regulator 73 (which also experiences temperature rise in operation) is in air flow relationship with the cooling apertures 99.

Figure 9:
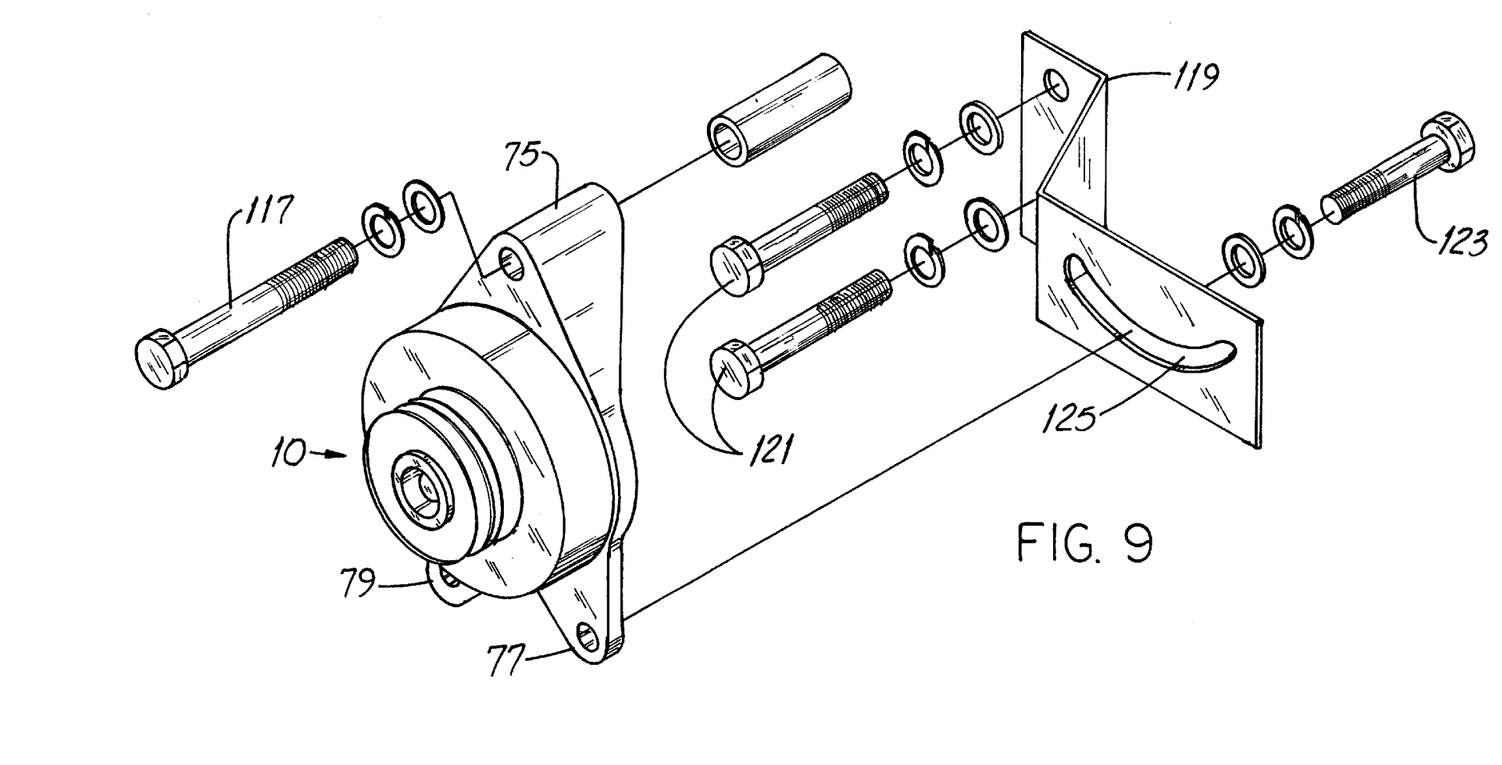
FIG. 9 is an exploded perspective view of the new alternator shown in conjunction with an exemplary engine mounting arrangement.
Figure 10:
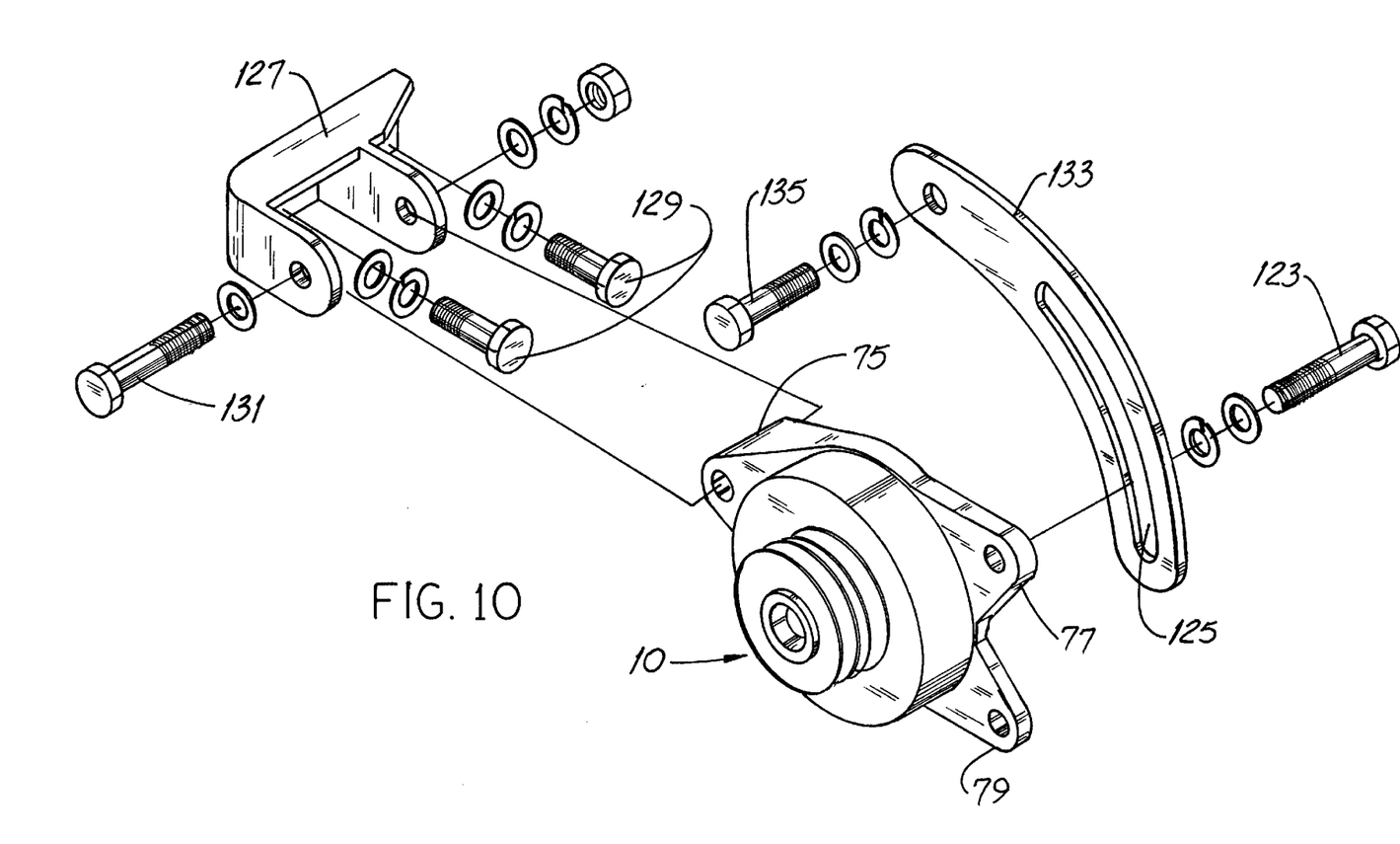
FIG. 10 is an exploded perspective view of the new alternator shown in conjunction with another exemplary engine mounting arrangement.

Referring next to FIGS. 1, 9 and 10, a primary use of the new alternator 10 is in combination with an internal combustion engine 11. In the arrangement of FIG. 9, the primary mount 75 is affixed to the block of an engine 11 by the primary fastener . A mounting bracket 119 is also fixed to the engine 11 by fasteners 121. The bracket 119 and first auxiliary mount 77 are coupled to one another by the first auxiliary fastener 123 and such bracket 119 includes a curved slot 125 for receiving the fastener 123 therethrough. When the fasteners 117, 123 are loosened slightly for alternator position adjustment, the alternator 10 may be pivoted about the fastener 117 and the fastener 123 moved along the slot 125 to adjust belt tension.

It is to be appreciated that in the arrangement of FIG. 9, the second auxiliary mount 79 is not used. That is, the mount 79 is spaced away from the mounting bracket 119, is out of alignment with such bracket 119 and is free of a fastener. In an engine 11 of another type, the bracket 119 and alternator 10 may be mounted in mirror image positions to those shown in FIG. 9. In such positions, the bracket 119 extends leftwardly from the engine block and the first auxiliary mount 71 is unused.

In the arrangement of FIG. 10, a support 127 is bolted to the engine block or other convenient structure by bolts 129.

The primary mount 75 is attached to the support 127 by the bolt 131 and the bracket 133 is similarly bolted to the engine block or other structure by the bolt 135. The auxiliary fastener 123 extends through the bracket slot 125 and threads to the auxiliary mount 77. The mount 79 is not used. Belt tension may be adjusted by loosening fastener 123 and bolt 131 and pivoting the alternator 10 to move the fastener 123 along the slot 125.

While the principles of the invention have been shown and described in connection with but a few preferred embodiments, it is to be understood clearly that such embodiments are by way of example and are not limiting.

What is claimed:

1. An electrical alternator for mounting to an internal combustion engine, the electrical alternator including (a) a stator with a plurality of radially-extending stator arms, each having a coil thereon, and (b) a rotor having an axis of rotation and including a support component with a plurality of magnets affixed thereto in excitation relationship to the coils, comprising:
   a hub including (a) a first hub portion having the stator affixed to the outer peripheral surface thereof, and (b) a second hub portion axially spaced from the first hub portion;
   a ribbed section affixed to the hub between the hub portions, the rib section including a primary mount opening spaced from the hub and first and second auxiliary mount openings spaced from the hub wherein:
   the primary mount opening is in registry with a primary radial normal to the axis of rotation;
   the first and second auxiliary mount openings are in registry with first and second auxiliary radials, respectively, such auxiliary radials being normal to the axis of rotation;
   a mounting bracket mounted to the engine and including an elongated slot therein;
   a primary fastener extending through the primary mount opening so as to pivotably mount the electrical alternator to the engine; and
   a secondary fastener extending through one of the auxiliary mount openings and through the slot for slidable movement therein wherein the ribbed section may be rigidly connected to the mounting bracket at a user selected position alone the slot.

2. The alternator of claim 1 wherein:
   the ribbed section is coincident with a section plane normal to the axis of rotation;
   the primary mount opening terminates in a primary mounting face axially spaced from the section plane by a first dimension; and
   the first and second auxiliary mount openings terminate in first and second mounting faces, respectively, and such first and second mounting faces are axially spaced from the section plane by a second dimension which is less than the first dimension.

3. The alternator of claim 1 wherein the ribbed section includes a plurality of cooling apertures in air flow relationship with the stator.

4. The alternator of claim 3 wherein the support component includes a face portion having a plurality of cooling holes therethrough, thereby permitting cooling air to flow through the support component and the ribbed section.

5. The alternator of claim 3 wherein:
   the ribbed section includes at least one mount rib extending radially away from the hub; and
   a voltage regulator is attached to the mount rib in air flow relationship with the cooling apertures.

6. The alternator of claim 1:
   the plurality of mounting openings includes a primary opening and first and second auxiliary openings;
   a primary fastener extends through the primary opening and is secured to the block;
   a first auxiliary fastener extends through the first auxiliary opening and is secured to the mounting bracket; and
   the second auxiliary opening is free of a fastener.

7. The alternator of claim 6 wherein:
   the primary mount opening terminates in a primary mounting face;
   the first and second auxiliary mount openings terminate in first and second mounting faces, respectively;
   the primary mounting face is against the block; and
   one of the auxiliary mounting faces is axially aligned with the mounting bracket.

8. The alternator of claim 1 wherein:
   the ribbed section is coincident with a section plane normal to the axis of rotation;
   the hub includes a bearing bore having a pair of shaft bearings mounted therein in spaced relationship to one another;
   the alternator includes a shaft rotatably supported by the bearings and having the support component and at least one drive pulley mounted thereon;
   the shaft bearings are spaced to opposite sides of the section plane;
   the alternator includes a rib-supported voltage regulator; and
   the voltage regulator and the support component are spaced to opposite sides of the section plane.

9. An electrical alternator for mounting to an internal combustion engine, comprising:
   a stator with a plurality of radially-extending stator arms, each having a coil thereon;
   a rotor having an axis of rotation and including a support component with a plurality of magnets affixed thereto in excitation relationship to the coils, the support component including a face portion having a plurality of cooling holes therethrough;
   a hub including a first hub portion having the stator affixed to the outer peripheral surface thereof, and a second hub portion axially spaced from the first hub portion;
   a ribbed section affixed to the hub between the hub portions, the ribbed section including a plurality of cooling apertures in air flow relationship with the cooling holes in the support component to permit cooling air to flow therethrough;
   a mount rib in the ribbed section extending radially away from the hub first portion; and
   a voltage regulator is attached to the mount rib in air flow relationship with the cooling air.

10. The alternator of claim 9 wherein the ribbed section includes a primary mount opening, and first and second mount auxiliary openings.

11. The alternator of claim 10 wherein:
   the primary mount opening is in registry with a primary radial normal to the axis of rotation; and
   the first and second auxiliary mount openings are in registry with first and second auxiliary radials, respectively, such auxiliary radials being normal to the axis of rotation.

12. The alternator of claim 11 wherein the included angle between the primary radial and the first auxiliary radial is greater than 90°.

13. The alternator of claim 11 further comprising:

a mounting bracket mountable to the engine and including an elongated slot therein; and a secondary fastener extending through one of the auxiliary mount openings and through the arcuate slot for slidable movement therein such that the ribbed section may be secured by the fastener to the mounting bracket at a user selected position the along the arcuate slot.

14. The alternator of claim 11 further comprising a primary fastener extending through the primary mount opening so as to pivotably mount the ribbed section to the engine.

15. The alternator of claim 9 wherein the ribbed section includes a primary mount portion having a primary mount opening extending therethrough.

16. The alternator of claim 15 further comprising:

a generally u-shaped support bracket interconnected to the engine and having first and second arms, each arm including a fastener receipt aperture centered on a common axis; and a primary fastener extending through the fastener receipt apertures in each arm of the u-shaped bracket and through the primary mount opening so as to pivotably retain the alternator on the u-shaped bracket.

17. The alternator of claim 9 wherein the included angle between the primary radial and the second auxiliary radial is greater than 90°.

18. The alternator of claim 17 wherein the included angle between the auxiliary radials is no greater than 75°.

19. The alternator of claim 17 wherein the ribbed section includes a plurality of ribs, the said plurality of ribs including a separate rib extending between the hub and each mount opening, thereby imparting substantial rigidity to the alternator.

* * * * *

UNITED STATES PATENT AND TRADEMARK OFFICE
CERTIFICATE OF CORRECTION

PATENT NO. : 5,914,551
DATED : 06/22/1999
INVENTOR(S): Kern et al

It is certified that error appears in the above-identified patent and that said Letters Patent is hereby corrected as shown below:

Col. 8, ln. 3, CLAIM 6, after "claim 1" insert ---wherein---;
Col. 8, lns. 4-9, CLAIM 6, cancel "the plurality of mounting openings includes a primary opening and first and second auxiliary openings; a primary fastener extends through the primary opening and is secured to the block; a first auxiliary fastener extends through the first auxiliary opening and is secured to the mounting bracket; and";
Col. 9, ln. 11, CLAIM 13, after "position" and before "along" cancel "the".

Signed and Sealed this

Sixth Day of June, 2000

Q. TODD DICKINSON

*Attest:*

*Attesting Officer*          *Director of Patents and Trademarks*